(12) United States Patent
Hoshino et al.

(10) Patent No.: US 7,672,051 B2
(45) Date of Patent: Mar. 2, 2010

(54) OPTICAL FILM AND SURFACE LIGHT SOURCE USING IT

(75) Inventors: Tetsuya Hoshino, Tsukuba (JP); Yasushi Sugimoto, Tsukuba (JP); Teruo Teshima, Chikusei (JP); Tomo Dobashi, Chikusei (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 18 days.

(21) Appl. No.: 10/557,898

(22) PCT Filed: May 21, 2004

(86) PCT No.: PCT/JP2004/007292

§ 371 (c)(1),
(2), (4) Date: Nov. 22, 2005

(87) PCT Pub. No.: WO2004/104658

PCT Pub. Date: Dec. 2, 2004

(65) Prior Publication Data

US 2007/0064294 A1    Mar. 22, 2007

(30) Foreign Application Priority Data

May 22, 2003    (JP) ............................. 2003-144213

(51) Int. Cl.
*G02B 5/18* (2006.01)
(52) U.S. Cl. .................. 359/569; 359/566; 359/599
(58) Field of Classification Search ................ 359/599, 359/566, 569
See application file for complete search history.

(56) References Cited

U.S. PATENT DOCUMENTS

| | | | |
|---|---|---|---|
| 5,631,754 A * | 5/1997 | Jannson et al. | ................ 349/64 |
| 6,275,338 B1 | 8/2001 | Arai et al. | |
| 2002/0034012 A1 * | 3/2002 | Santoro et al. | ............... 359/599 |
| 2003/0099039 A1 * | 5/2003 | Kashima et al. | ............. 359/599 |
| 2007/0064294 A1 * | 3/2007 | Hoshino et al. | ............. 359/237 |

FOREIGN PATENT DOCUMENTS

| | | |
|---|---|---|
| JP | 07-270603 | 10/1995 |
| JP | 11-295713 | 10/1999 |

(Continued)

OTHER PUBLICATIONS

Victor Soifer, Victor Kotlyar, and Leonid Doskotovich, "Iterative Methods for Diffractive Optical Elements Computation," Taylor Francis (1997), pp. 1-11.

(Continued)

*Primary Examiner*—Joshua L Pritchett
(74) *Attorney, Agent, or Firm*—Antonelli, Terry, Stout & Kraus, LLP.

(57) ABSTRACT

An optical film 10 has a transparent base film 11 made of polyethylene terephthalate (PET), a prism made of photo-curing resin such as acryl modified epoxy on an incident surface 12 that is one face of the base film 11, and a hologram similarly made of photo-curing resin on an exit surface 13 opposing the incident surface 12. The prism has grooves or ridges each having a substantially triangular cross section to totally reflect incident light so as to bend the light into a direction perpendicular to the exit surface 13. The hologram anisotropically diffuses light exiting from the exit surface 13, to improve brightness.

8 Claims, 9 Drawing Sheets

FOREIGN PATENT DOCUMENTS

| | | |
|---|---|---|
| JP | 2002-071959 | 3/2002 |
| JP | 2003-035824 | 2/2003 |
| WO | WO 02/08662 | 1/2002 |

OTHER PUBLICATIONS

International Publication No. WO 2004/104658A-1 Cover Sheet.
Written Opinion of the International Search Report (in Japanese).
Notification Concerning Submission or Transmittal of Priority Document.
Second and Supplementary Notice Informing the Application of the Communication of the International Application to the Designated Offices.
International Search Report (in English and Japanese).
Korean Official Action issued on Jul. 16, 2007, for Application No. 10-2005-7022183.
Chinese Official Action issued on Mar. 23, 2007, for Application No. 200480014156X.

\* cited by examiner

FIG.1 Background
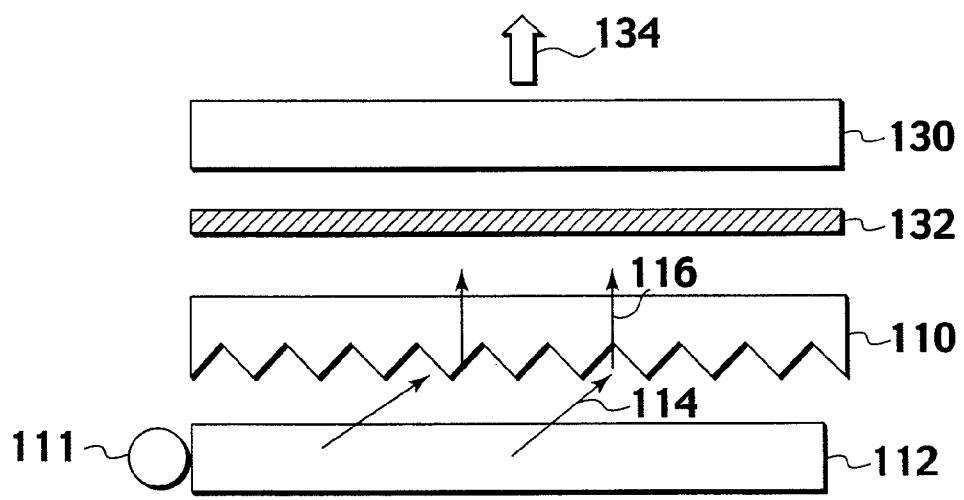
FIG.2 Background
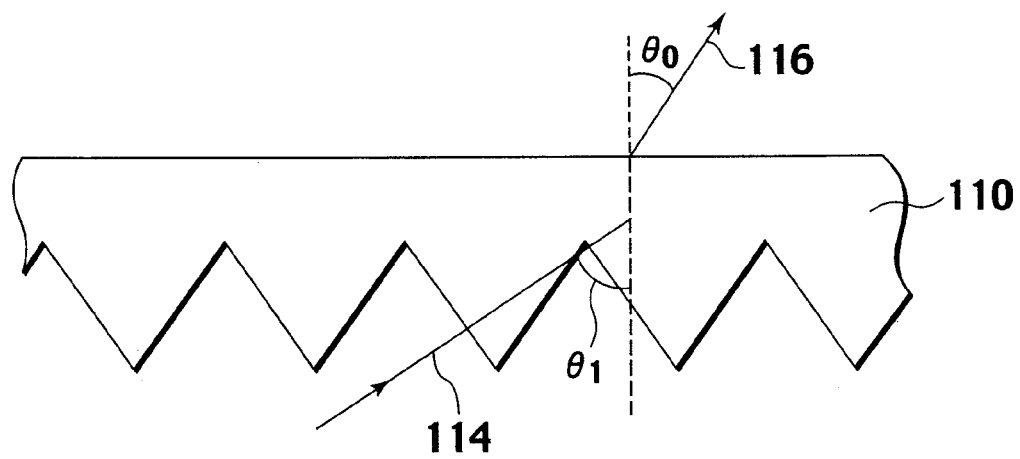

OPTICAL FILM AND SURFACE LIGHT SOURCE USING IT

TECHNICAL FIELD

The present invention relates to an optical film for controlling the direction of outgoing light and a surface light source employing such an optical film.

BACKGROUND ART

Liquid crystal displays are used as computer displays, control panels of home appliances, cellular phone displays, and the like. There is an increasing demand for reducing the power consumption, weight, and thickness of the liquid crystal display. The liquid crystal display typically employs a transmissive liquid crystal panel.

The liquid crystal display of this type employs a surface light source as a backlight to illuminate a liquid crystal panel from the back. The surface light source has a light guide to emit areal light based on light from a light source and an optical film to control the direction of outgoing light of the light guide so that as much light as possible is emitted toward the front of an observer who watches the liquid crystal display.

FIG. 1 shows a configuration of a liquid crystal display according to a related art.

The liquid crystal display has a light source 111 such as a light emitting diode for emitting white light, a light guide to guide the light from the light source 111 and emit areal light, an optical film 110 such as a prism sheet to bend light 114 obliquely emitted from the light guide 112 into a direction perpendicular to an exit surface, a diffuser 132, and a transmissive liquid crystal panel 130 to display images. From the liquid crystal display toward an observer, light 134 illuminated the liquid crystal panel 130 is emitted.

The diffuser 132 is arranged to suppress moire fringes caused by periodical prism or hologram structures of the optical film 110 and periodical pixel intervals in the liquid crystal panel 130, subdue Newton rings occurring between the liquid crystal panel 130 and the optical film 110, and reduce a chromatic dispersion of light 116 emitted from the optical film 110. The diffuser 132, however, adds interfaces and decreases brightness due to Fresnel reflection by the interfaces. To cope with this, there has been proposed an idea to form the diffuser 132 on the exit surface of the optical film 110. Japanese Unexamined Patent Application Publications No. 9-281310 and No. 9-281311 include microscopic beads or rods in an exit surface of an optical film to roughen the exit surface with irregularities and provide the exit surface with a light diffusing ability. This technique may suppress moire fringes and Newton rings but is unable to control the range of diffusion angles of the microscopic beads or rods. As a result, light may substantially uniformly diffuse into every direction, to drastically deteriorate front brightness.

In the liquid crystal display, the light source 111, light guide 112, optical film 110, and diffuser 132 form a surface light source for supplying areal light to the liquid crystal panel 130.

FIG. 2 shows a relationship between incident light 114 and outgoing light 116 on the optical film 110.

The incident light 114 to the optical film 110 forms an incident angle θi and the outgoing light 116 from the optical film 110 forms an output angle θo. The incident angle θi and output angle θo are angles made by the incident light 114 and outgoing light 116 with respect to normals of the incident and exit surfaces of the optical film 110, respectively.

The incident angle θi with respect to the optical film 110 is dependent on the design of the light guide 112 and is in the range of 20° to 80°. A role of the optical film 110 is to efficiently bend light obliquely made incident from the light guide 112 to the incident surface into a direction perpendicular to the exit surface, i.e., a direction in which the output angle θo is 0°. For this, the material and shape of the optical film 110 must be designed to reduce Fresnel reflection, i.e., interfacial reflection between an air layer and the optical film 110 and maximize light that advances in the 0° direction. If the outgoing light 116 has an angular distribution, the optical film 110 is provided with a light bending characteristic so as to maintain brightness in a perpendicular direction even if the incident angle θi slightly varies. This may increase brightness in a front direction compared with providing a fixed light bending angle. The light source emits white light, and therefore, it is necessary to reduce wavelength-dependent dispersion and suppress unevenness and blurs in images displayed on the liquid crystal panel 130.

The optical film 110 and light guide 112 employ a refraction law such as the Snell's law to bend outgoing light in a geometrical-optical manner. In this case, the optical film 110 may be made of a prism sheet having an incident surface provided with prism grooves and ridges. The prism sheet of this type is structurally simple and is easy to manufacture.

In place of the conventional refractive prism sheet, a hologram optical film may be used. The hologram optical film utilizes a diffraction phenomenon based on the wave characteristic of light. Employing the hologram realizes a function of bending light as well as a function of condensing light. A method of designing an optical element with a hologram is disclosed in, for example, Victor Soifer, Victor Kotlyar, and Leonid Doskolovich, "Iterative Methods for Diffractive Optical Elements Computation," Taylor Francis (1997).

The hologram has been considered improper for bending white light because it causes spectral dispersion and high-order diffraction.

It is known that obliquely emitting light from a light guide provides the emitted light with directivity and that bending the directive light in a perpendicular direction improves brightness. (For example, refer to Japanese Patent Publication No. 2739730.)

An optical film employing any one of the prism sheet and hologram is required to further increase the brightness of outgoing light oriented in a direction controlled by the optical film.

As mentioned above, perpendicularly bending directive light obliquely emitted from a light guide improves the brightness of the light. It is difficult, however, to align output angles over the surface of the light guide. Then, brightness unevenness easily occurs. There is an idea to insert a diffuser capable of maintaining brightness and eliminating brightness unevenness between the light guide and the optical film. To achieve this, the diffuser must have a limited range of diffusion angles. The diffuser having a limited range of diffusion angles, however, hardly secures a required diffusion characteristic to control a brightness distribution if light is obliquely made incident thereto from the light guide.

SUMMARY OF THE INVENTION

In consideration of these circumstances, an object of the present invention is to provide an optical film for controlling a light emitting direction, capable of maintaining high brightness and preventing moire fringes, Newton rings, and brightness unevenness. Also provided is a surface light source employing the optical film.

In order to accomplish the objects, an optical film according to the present invention has an incident surface having a shape to bend incident light and an exit surface opposing the incident surface and having a diffuser to diffuse light only into a specific spatial range of angles. The shape of the incident surface is to bend light made incident to the incident surface into a direction perpendicular to the exit surface.

Preferably, the incident light is white light, and the shape of the incident surface is to bend the white light into a direction perpendicular to the exit surface.

Preferably, the shape of the incident surface includes grooves or ridges at average intervals of 200 µm or below.

Preferably, the grooves or ridges are formed as concentric circular arcs.

Preferably, the grooves or ridges form a hologram.

Preferably, the hologram is a transmissive diffraction grating that bends white light having an incident angle of 60°±15° into a direction perpendicular to the exit surface and has a sawteeth shape with average intervals of $m1\times(5.0\pm1.0)$ µm and an average depth of $m2\times(3.7\pm1.0)/(n-1)$ µm where n is the refractive index of an optical material and m1, m2=1, 2, 3, . . . .

Preferably, the sawteeth shape is approximated with N levels (N=4, 5, 6, . . . ).

Preferably, the grooves or ridges each have a substantially triangular cross-sectional shape.

Preferably, the grooves or ridges utilize a principle that light causes total reflection in a triangle, to bend light.

Preferably, diffusion angles of the diffuser on the exit surface are 10 degrees or below in every direction. Preferably, the diffusion angles have an angle width corresponding to ½ of a peak intensity on a graph of angles and transmitted light intensities. More preferably, the diffusion angles are 5 degrees or below and include anisotropic angles such as 5 degrees in an X-direction and 2 degrees in a Y-direction.

Preferably, a haze value of the diffuser on the exit surface is 50% or below. More preferably, it is 25% or below.

Preferably, the diffuser on the exit surface is formed by embossing.

Preferably, the embossing is transferring from an electroformed mold having a pattern of speckles.

Preferably, the embossing is transferring from a metal mold roll having microscopic irregularities. Preferably, it employs a metal mold roll having microscopic irregularities formed by machining, or plating, or machining and plating.

A surface light source according to the present invention is formed by arranging the above-mentioned optical film on a light exit surface of a light guide. The incident surface of the optical film where the shape to bend incident light is formed is oriented toward the light guide.

Preferably, the exit surface of the light guide is integrally provided with a hologram diffuser having an anisotropic diffusing characteristic.

Preferably, a film having a function of preventing polarization split, color separation, and reflection is arranged between the light guide and the optical film, or on the exit surface of the optical film. Preferably, arranging a discrete diffuser film is not needed.

Preferably, the exit surface of the light guide and the incident and exit surfaces of the light bending material are in parallel with one another.

Preferably, the light guide emits light at an angle close to the exit surface thereof, i.e., at a large output angle, to provide the light with directivity in this direction. The light guide little bends incident light from a light source and emits the light at a large output angle, to thereby secure high brightness.

Preferably, the light bending material maintains the directivity provided by the light guide and bends the light in a direction perpendicular to the exit surface. Preferably, the diffuser efficiently diffuses light emitted from the material into a narrow diffusing range. With the material making light substantially perpendicularly incident to the diffuser, the diffuser can evenly diffuse the light without decreasing brightness.

Preferably, the brightness of light emitted from the light guide has a peak in the output angle range of 50° to 80° on the exit surface of the light guide, and a half-value width of the peak is 30° or below. Preferably, the light bending material bends light emitted from the light guide in a direction perpendicular to the exit surface of the light guide while keeping the directivity of the light. Preferably, the diffuser is a vertical deflection diffuser to efficiently diffuse light emitted from the material into a narrower range.

BRIEF DESCRIPTION OF THE DRAWINGS

FIG. 1 is a view showing a configuration of a conventional liquid crystal display;

FIG. 2 is a view showing a relationship between incident light and outgoing light on an optical film;

BEST MODE FOR CARRYING OUT THE INVENTION

Best modes of implementation of an optical film and surface light source according to the present invention will be explained in detail with reference to the drawings.

Figure 3:
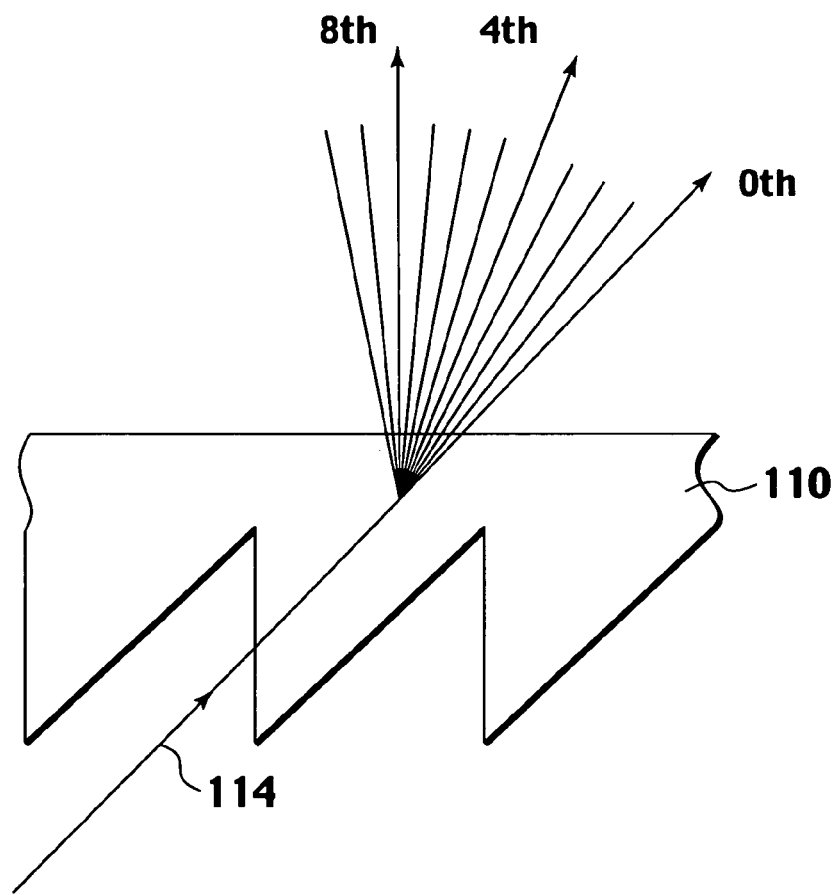
FIG. 3 is a view showing the directions of diffracted light from a diffraction grating formed on an optical film.

FIG. 3 is a view showing directions of diffracted light from a diffraction grating formed on an optical film 110.

The diffraction grating forms a hologram and has intervals of 5 μm. When wavelengths of red (λ1=620 nm), green (λ2=550 nm), and blue (λ3=480 nm) are made incident at 60°, their seventh-, eighth-, and ninth-order light, respectively, are diffracted into a perpendicular direction. In the case of the green light shown in FIG. 3, the eighth-order light is in a perpendicular direction. With optimum depths, the diffraction efficiencies of these wavelengths show peaks in the seventh-, eighth-, and ninth-order light, respectively. Namely, the diffraction grating achieves small wavelength dispersion. If an incident angle is θ, a refractive index in air is n0, a refractive index of the material of the diffraction grating is n, grating intervals are d, an order of diffraction of λ3 is m, a difference among the orders of diffraction of λ1, λ2, and λ3 is identical to be m1, and an output angle is 0°, the following is established when light is made incident to the diffraction grating:

$$n0 \cdot \sin(\theta) - n \cdot \sin(0) = m \cdot \lambda 3 / d \quad (1)$$
$$\approx (m = m1) \cdot \lambda 2 / d$$
$$\approx (m - 2 \cdot m1) \cdot \lambda 1 / d$$

By solving this with n0=1, the following (2) and (3) are provided:

$$d = 0.48 \ \mu m \cdot m1 \cdot \lambda 2 / \{(\lambda 2 - \lambda 3) \sin(\theta)\} \quad (2)$$

$$m = m1 \cdot \lambda 2 / (\lambda 2 - \lambda 3) \quad (3)$$

When m1 is fixed, the grating intervals d are determined by the sine of the incident angle.

White light obliquely made incident to an optical film can be bent by a hologram in a direction perpendicular to an exit surface of the optical film. The white light is light containing three primary colors, i.e., red, blue, and green. Bending light in a perpendicular direction means making light obliquely incident to a plane of an optical element having a diffraction effect and changing the direction of the incident light into a normal of the plane.

When monochromatic light is passed through a hologram, a plurality of diffractions occur to provide first-order light, second-order light, and the like. These rays of light propagate at respective diffraction angles, to deteriorate a light bending efficiency. When white light is bent by diffraction, chromatic dispersion usually occurs due to different diffraction angles depending on wavelengths. The chromatic dispersion and the deterioration of light bending efficiency may be subdued with a properly designed hologram.

Figure 4:
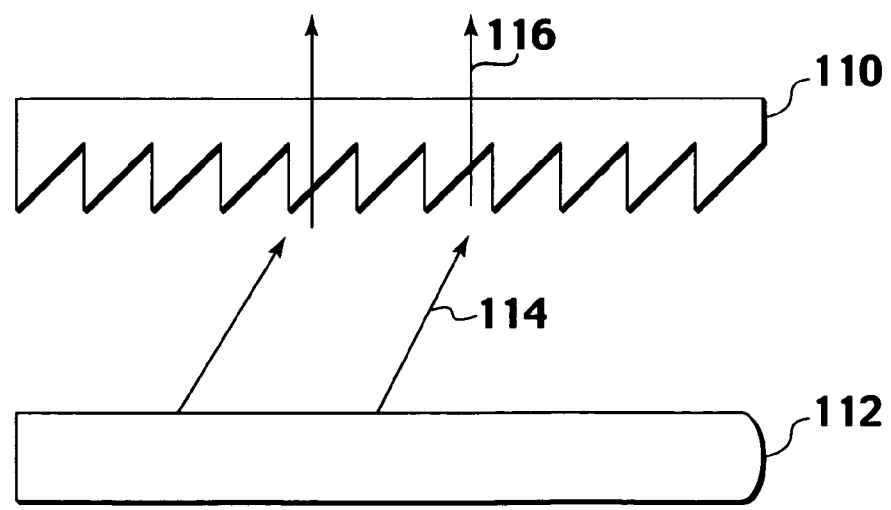
FIG. 4 is a view showing an action of a hologram formed on an optical film.

FIG. 4 shows an action of a hologram formed on an optical film 110.

As shown in FIG. 4, the hologram formed on an incident surface of the optical film 110 bends light 114 obliquely emitted from a light guide 112 into a direction perpendicular to an exit surface and provides outgoing light 116.

The hologram can efficiently bend white light emitted from the light guide 112.

The hologram is typically a diffraction grating. The direction of grooves of the diffraction grating may be perpendicular or parallel to incident light. The grooves may be cut in longitudinal and lateral directions. The hologram may be a CGH (computer generated hologram) made of many pixels. The hologram may be of a surface relief type or a volume phase type. The hologram may be formed on one or both faces of the optical film 110. The hologram may be overlaid on the optical film 110.

Figure 5:
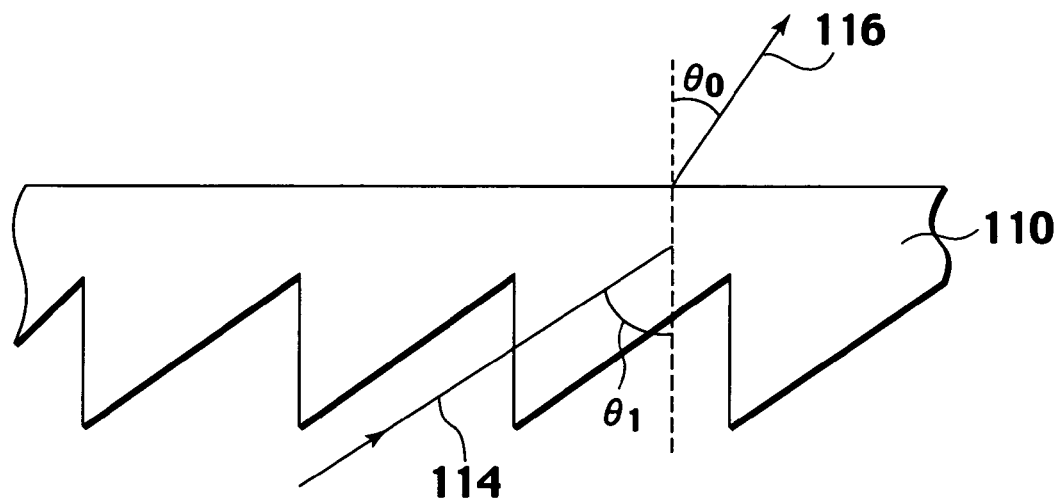
FIG. 5 is a view showing a relationship between an incident angle and an output angle on a diffraction grating formed on an optical film.

FIG. 5 is a view showing a relationship between an incident angle and an output angle on the diffraction grating formed on the optical film 110.

In a surface light source, the light guide 112 emits white light containing the three primary colors, i.e., red, green, and blue. Due to the designing of the surface light source, an incident angle formed between a perpendicular line on the surface of the diffraction grating formed on the incident surface of the optical film 110 and the incident light to the grating surface is usually in the range of 60°±15°. If 60% or more of the light transmitted through the diffraction grating is within the range of ±10° around a perpendicular line on the exit surface of the optical film 110, to advance toward the front of an observer, it will be said that the light has been bent in a perpendicular direction. When light is made incident at an incident angle of 60°, dispersion angles of the wavelengths of 480 nm (blue) and 620 nm (red) are determined by the intervals of the grating and are 9° or smaller if the intervals are 1.2 μm or greater. The wavelength dependence of a diffraction angle of 10° or smaller is small, and therefore, polarization dispersion must be considered in addition to the wavelength dispersion. It is assumed that a polarized wave A has a large diffraction efficiency in connection with an order close to perpendicular and a polarized wave B has a small diffraction efficiency in connection with the same. Then, polarized wave dependence is small if (A−B)/A is 20% or lower. If the polarized wave dependence is 5% or larger, it is preferable to improve the diffraction efficiency of polarized waves required by the surface light source. In addition to the light bending function, the diffraction grating may have optical functions. The diffraction grating may be formed not only on a flat surface but also on a curved surface so as to add optical functions. The diffraction grating may be used with a prism sheet. For example, in an x-y-z space, the diffraction grating may bend light in the x-direction while the prism sheet may bend the same in the y-direction.

In the surface light source, the light guide 112 emits white light, which is bent in a perpendicular direction by the hologram formed on the optical film 110. The optical film 110 may be provided with a function of preventing polarization split, color separation, and reflection, to improve the efficiency of use of light.

The function of preventing polarization split, color separation, and reflection may be realized by forming a microscopic periodic structure. The hologram may be a surface relief hologram serving as a diffraction grating. The surface relief hologram is manufacturable by transferring to realize high productivity and mass production.

Figure 6:
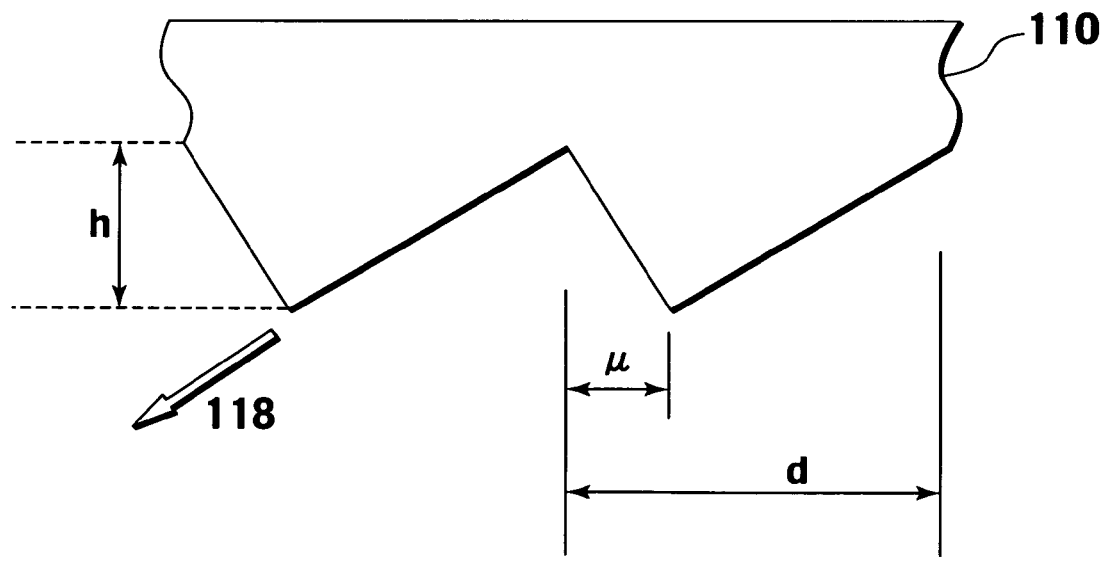
FIG. 6 is a relationship among the depth, intervals, and sawtooth displacement of a diffraction grating formed on an optical film.

FIG. 6 is a view showing a relationship among the depth, intervals, and sawtooth displacement of a diffraction grating formed on an optical film 110.

If the diffraction grating is too deep or too shallow, the efficiency of emitting light in a direction perpendicular to an exit surface deteriorates. If an incident angle is 60°, an average interval d is between 0.6 μm and 10 μm, and a refractive index of the diffraction grating is n, the light emitting efficiency will be high if an average depth h of the grating grooves satisfies m×d/(n−1) with 0.5<m<1.0. At this time, an optimum depth is dependent on the intervals and a displacement u of sawtooth ridges. If the intervals are 5 μm and a displacement quantity u/d is 0%, an optimum depth will be 7.4 μm. If the intervals are 5 μm and u/d is 20%, an optimum depth will be 6.2 μm.

An important factor is an inclination angle of a slope of the diffraction grating. The grooves may be buried to several tens of percent of the depth thereof. Diffraction gratings used for the present invention have deep grooves. This sort of diffraction gratings may be mass-produced by transferring with the use of a mold. Resin used for the transferring with a mold may be thermosetting resin or UV curing resin.

A mold with deep grooves may be formed by applying electron beam resist on a quartz substrate, drawing lines with electron beams, and patterning the resist with RIE (reactive ion etching). Alternatively, X-rays may be employed to expose and develop deep grooves on a mold. Instead, a gray-scale mask pattern may be exposed and developed to form the same. Also possible is to machine grooves in a mold with a cutting tool. The resin material of the optical film to which grooves are transferred from a mold may be determined according to the using conditions of the optical film. The resin may be acrylic resin or PMMA resin having a good light transmissivity, or olefin resin having a good transferring ability.

As shown in FIG. 6, the orientation of a sawtooth is defined with the direction of a long side as indicated with an arrow 118. As the orientation of a sawtooth becomes parallel to incident light, the diffraction efficiency of the optical film 110 improves. If it becomes closer to a perpendicular direction relative to incident light, the diffraction efficiency deteriorates.

The diffraction grating is formed on an incident surface of the optical film 110. Namely, it is formed on the surface to which light from the light guide 112 is made incident, to diffract the incident light from the light guide 112.

Generally, light that obliquely enters and exits a film enlarges a Fresnel loss. Downwardly orienting the sawteeth of a diffraction grating can reduce the Fresnel loss of incident light. The diffraction gating formed on the optical film 110 emits light in a direction perpendicular to the exit surface of the film, to thereby reduce the Fresnel loss.

Figure 7:
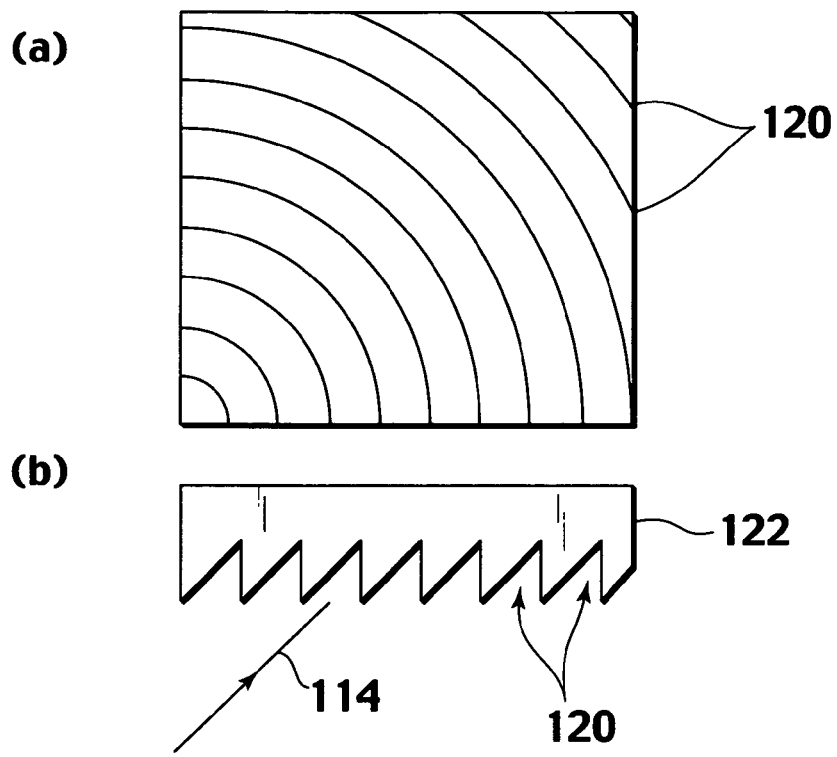
FIG. 7 is a view showing an example of the shape of a groove of a diffraction grating formed on an optical film.

FIG. 7 is a view showing an example of the shape of a groove 120 of a diffraction grating formed on an optical film 110. FIG. 7(a) is a top view showing the optical film 110, and FIG. 7(b) is a front view showing the optical film 110.

The groove 120 of the diffraction grating has a sector shape to bend light from a spot light source into a perpendicular direction and improve brightness. The sector groove 120 is a sawtooth, and a plurality of such grooves are extended along concentric circles. The grooves form arc reflection faces. The sector grooves 120 are not necessary to be continuous.

Figure 8:
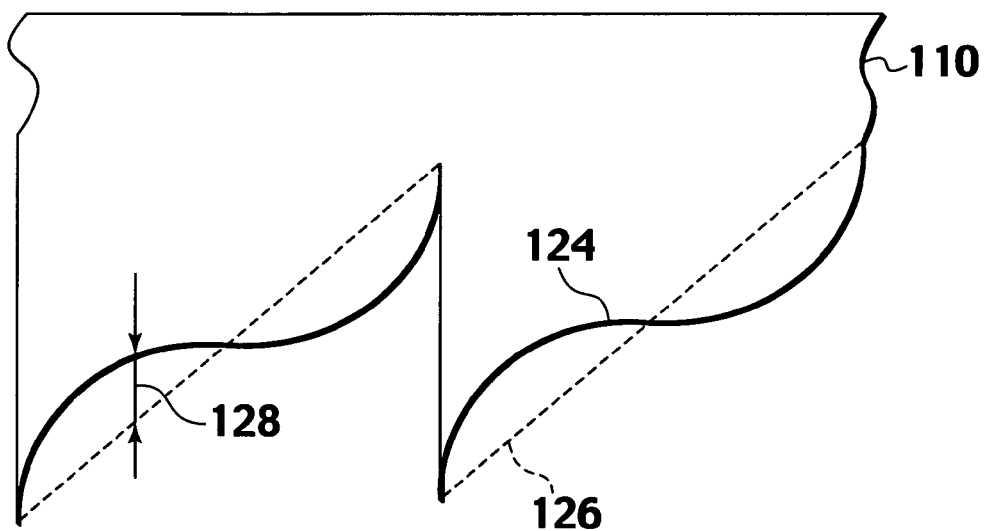
FIG. 8 is a view showing the magnitude of a displacement from a triangular sawtooth of a diffraction grating formed on an optical film.

FIG. 8 is a view showing the magnitude of a displacement from a triangular sawtooth 126 of a diffraction grating formed on an optical film 110.

A maximum diffraction efficiency point is displaced from the sawtooth 126. FIG. 8 shows this displacement 128. An optimum grating shape is dependent on an incident angle, a wavelength, intervals, a depth, and a refractive index. A method of finding an exact solution of the diffraction efficiency of a periodic diffraction grating may be employed to try and fail various grating shapes and find an optimum grating shape.

The diffraction efficiency of a diffraction grating in a perpendicular direction must be practically 70% or more. A prism sheet made of an optical film 110 and a prism formed thereon can realize a high bending efficiency of about 90% including a Fresnel loss. The diffraction grating formed on the optical film 110 can achieve an equivalent performance.

When a LED is employed as a light source, brightness unevenness frequently occurs around a light incident part of a light guide. The brightness unevenness may be suppressed by arranging a diffraction grating or a hologram instead of a prism sheet on the optical film 110 that is set on the light guide.

Figure 9:
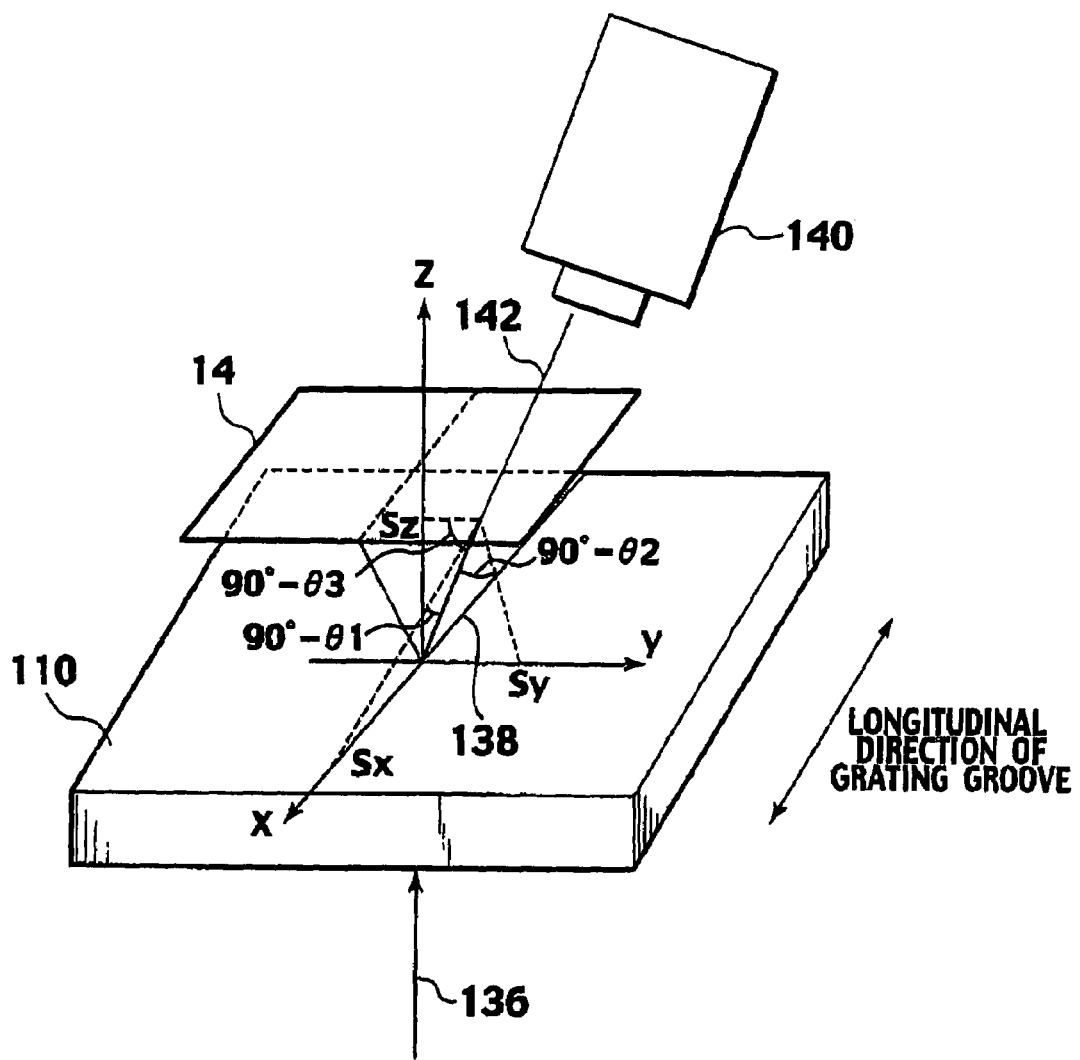
FIG. 9 is a view showing vectors (Sx, Sy, Sz) to define a light diffusing direction on a diffuser.

FIG. 9 is a view showing vectors (Sx, Sy, Sz) defining a light dispersion direction of a diffuser.

An optical film 110 has a diffraction grating whose grooves run in a x-direction. An exit surface of the optical film 110 is in a x-y plane, and light is propagated in a z-direction. Incident light 136 advances in the z-direction, and scattered light 142 from the optical film 110 advances toward an observation unit 140. A unit vector 138 is oriented in the scattering direction. An end point of the unit vector 138 is included in a reference plane 144 that is parallel to the optical film 110.

The vectors (Sx, Sy, Sz) are defined by direction cosines $(\cos(\theta 0), \cos(\theta 2), \cos(\theta 3))$ of the unit vector oriented in the scattering direction. The angles $\theta 1$, $\theta 2$, and $\theta 3$ are formed between the unit vector and the x-, y-, and z-axes, respectively.

The range of $\theta 1$ is narrowed as small as possible, and the range of $\theta 2$ is set to a size that fills a valley between the angle distributions of adjacent order numbers. For example, if an eighth-order diffraction angle is 0° and a ninth-order diffraction angle is 7°, an ideal diffuser is to satisfy the conditions of $-\cos(83°)<Sy<\sin(83°)$ and $Sx=0$. To eliminate color unevenness from light from the light guide 112, a preferable diffuser is obtained by reversing the x- and y-directions and by satisfying the conditions of $-\cos(83°)<Sx<\sin(83°)$ and $Sy=0$. Such a hologram diffuser is manufacturable according to, for example, a method disclosed in Japanese Unexamined Patent Application Publication No. 2001-71959. The hologram diffuser may be of the surface relief type or of the volume phase type.

The optical film 110 may improve a light using efficiency by polarization or wavelength selection. When light from the surface light source is made incident to the optical film 110 at an incident angle of about 60°, the optical film 110 may have a relief shape of 0.6 μm or below in intervals and 0.5 μm or below in depth. Then, the optical film 110 reflects light having specific wavelengths and polarization at an efficiency of 80% or more and transmits the remaining light at an efficiency of 80% or more. An optimum relief shape is selected according to a wavelength and incident angle. The reflected light may be reused to improve the light using efficiency. Relief shapes may be designed according to red, green, and blue color filter matrixes, to have optimum intervals less than 0.6 μm and optimum depths less than 0.5 μm. The relief shapes are combined with films for bending light in a perpendicular direction, and the matrixes are positionally adjusted to one another, to provide a liquid crystal display having an improved light using efficiency without losses caused by polarizing films and color filters. The polarizing film causes a loss of one of two polarized beams, i.e., 50% of light, and the color filter causes a loss of two of the three primary colors, i.e., 67% of light. Transmitting a given polarized beam and a given color and reusing returned light can remarkably improve the using efficiency of the light. The relief shape to bend light and the small grating of submicron intervals can reduce Fresnel reflection at an interface between air and the film, and therefore, it is preferable to form the relief shape on each of the top and bottom surfaces of the film. Any number of layers of the grating of submicron intervals may be formed one upon another. In the surface light source, a light emitting layer, i.e., an exit surface of the light guide is preferably provided with a diffuser and a reflection preventive film.

Figure 10:
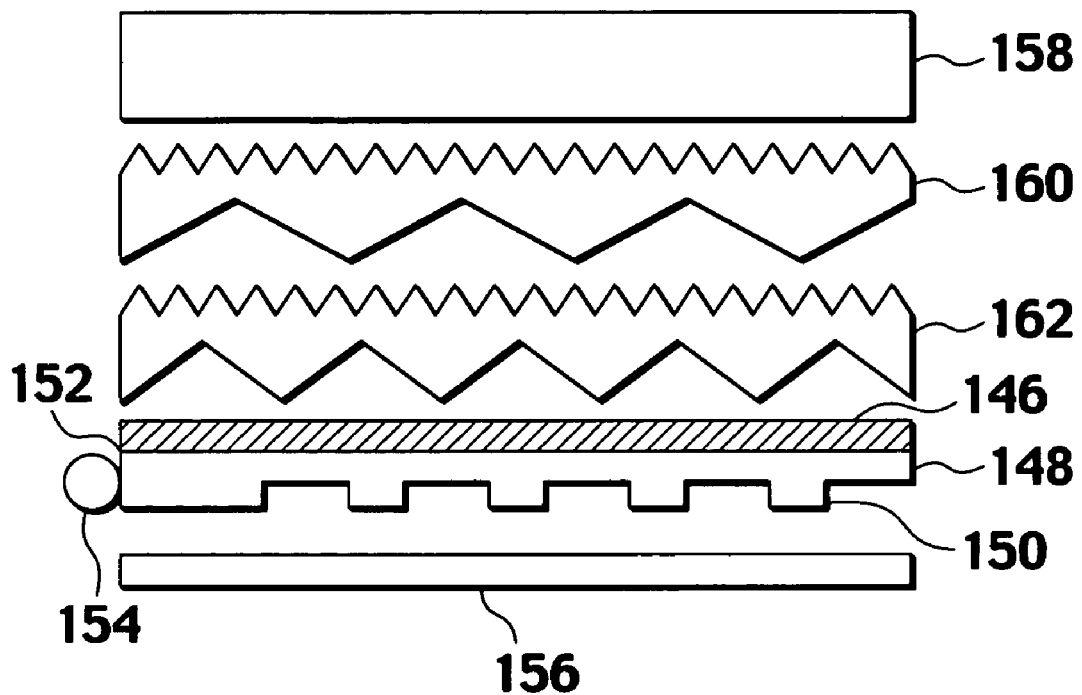
FIG. 10 is a view showing another example of a liquid crystal display.

FIG. 10 is a view showing another example of a liquid crystal display.

In the liquid crystal display, light from a light source 154 is made incident to a left end face 152 of a light guide 148. The light is reflected by a back face 150 of the light guide 148. Thereafter, the light is diffused by a diffuser 146 on the surface of the light guide 148. The light is then bent by optical films 160 and 162 such as diffraction gratings and is emitted into a perpendicular direction. A reflection angle at the back face 150 of the light guide 148, a diffusion angle at the surface of the light guide 148, and bend angles at the optical films 160 and 162 are optimally adjusted to improve brightness in the perpendicular direction.

A light spreading angle is dependent on a distance from the light source 154, and therefore, diffusion characteristics may be changed depending on locations to realize uniform brightness over an area.

If the optical films 160 and 162 have refractive index n1 and the refractive index of air is n0, a Brewster angle θB for light made incident to the optical films 160 and 162 is defined as follows:

$$\tan(\theta B) = n1/n0 \qquad (4).$$

When light is made incident to the optical films at the Brewster angle, a component whose electric field vector oscillating direction is in parallel with an incident surface is completely transmitted. Accordingly, a transmissivity of 100% is realizable at an interface by selecting polarized light (P component) of this side. A hologram has polarized wave dependence. Generally, a polarized wave having a high transmissivity with respect to a flat plane and a polarized wave having a high transmissivity with respect to a hologram are oriented in the same direction, and therefore, a polarized wave having a high transmissivity can be selected at each of the flat plane and hologram.

Embodiments

Embodiments of the present invention will be explained with reference to the drawings. These embodiments are not intended to limit the present invention.

Figure 11:
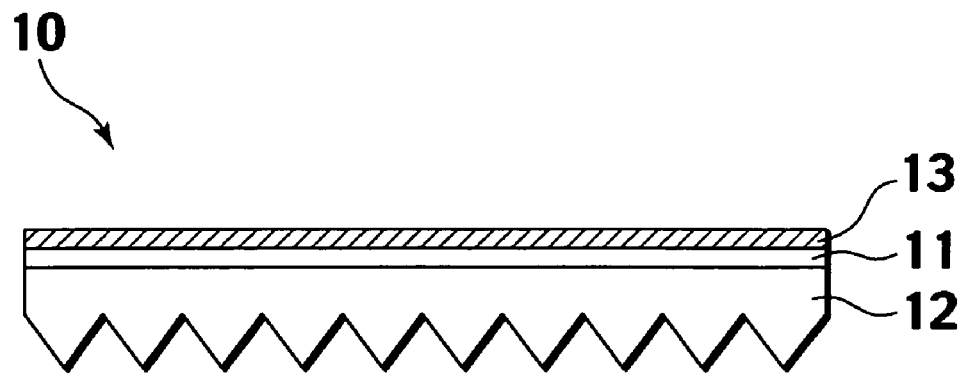
FIG. 11 is a view showing a configuration of an optical film according to an embodiment of the present invention.

FIG. 11 is a view showing a configuration of an optical film according to an embodiment of the present invention.

The optical film 10 has a transparent base film 11. One face of the base film 11 is an incident surface 12 on which a predetermined shape is formed. The other face of the base film 11 is an exit surface 13 on which a hologram is formed.

The base film 11 is made of, for example, polyethylene terephthalate (PET). The predetermined shape on the incident surface 12 and the hologram on the exit surface 13 are formed from photo-curable resin.

The base film 11 bends incident white light through the predetermined shape formed on the incident surface 12 and perpendicularly emits the light from the exit surface 13. The hologram formed on the exit surface 13 serves as a diffuser to diffuse the light emitted from the exit surface 13.

The predetermined shape on the incident surface 12 may be a prism to refract light in a geometrical-optical manner. The prism has grooves or ridges each substantially having a triangular cross section in which light is totally reflected. Using this total reflection, the prism bends the direction of light.

The incident surface 12 may have a diffraction grating or hologram that utilizes the wave characteristic of light to bend light.

Figure 12:
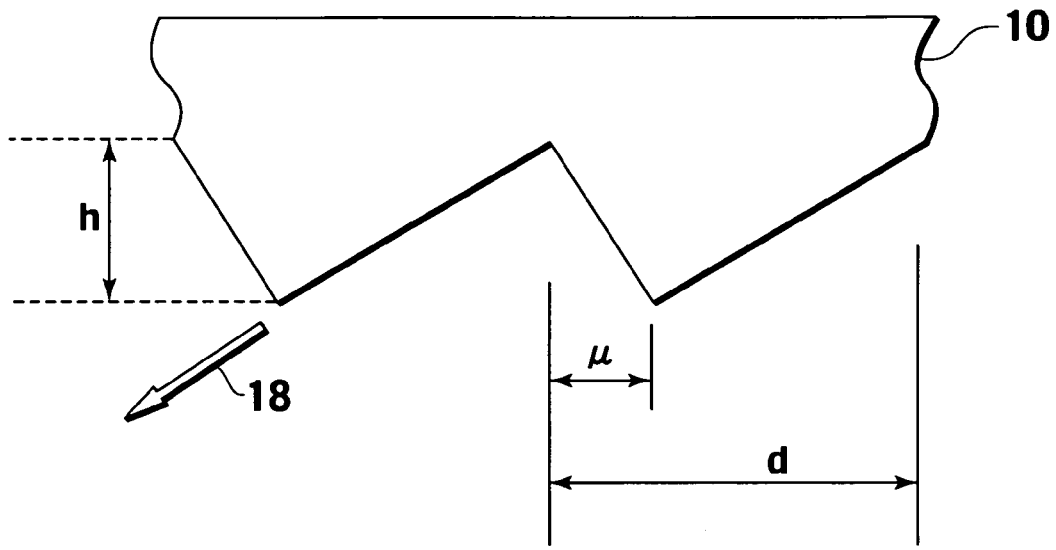
FIG. 12 is a view showing the shape of a diffraction grating formed on an incident surface of an optical film.

FIG. 12 is a view showing the shape of a diffraction grating formed on the incident surface 12 of the optical film 10.

The dimensions of the diffraction grating are h=6.2 μm, d=5 μm, and u=1 μm.

The predetermined shape formed on the incident surface 12 may be a hologram having grooves or ridges formed at average intervals of 200 μm or below. The hologram is a transmissive diffraction grating that bends white light made incident at an incident angle of 60°±15° into a direction perpendicular to the exit surface and has a sawteeth shape with average intervals of m1×(5.0±1.0) μm and an average depth of m2×(3.7±1.0)/(n−1) μm where n is the refractive index of an optical material and m1, m2=1, 2, 3, . . . . The optical characteristics of the diffraction grating are mainly determined by an inclination of the slope. Even if the grooves are buried up to, for example, 50% of the depth, the diffraction grating will function. The sawteeth shape is approximated with N levels (N=4, 5, 6, . . . ). Namely, the slope is approximated with (N−1) steps.

Figure 13:
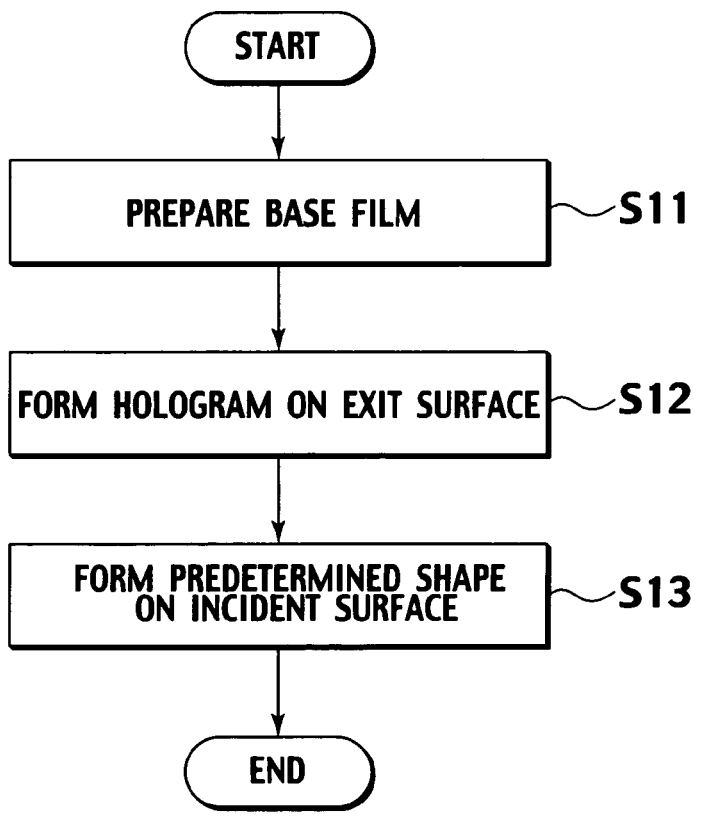
FIG. 13 is a view explaining a method of manufacturing an optical film.

FIG. 13 is a view explaining a method of manufacturing the optical film 10.

In first step S11, a base film serving as a base of the optical film 10 is prepared. The base film may be made from, for example, polyethylene terephthalate (PET).

In step S12, a hologram is formed on an exit surface of the base film prepared in step S11. In step S13, a predetermined shape such as a diffraction grating is formed on an incident surface opposing to the exit surface of the base film.

Figure 14:
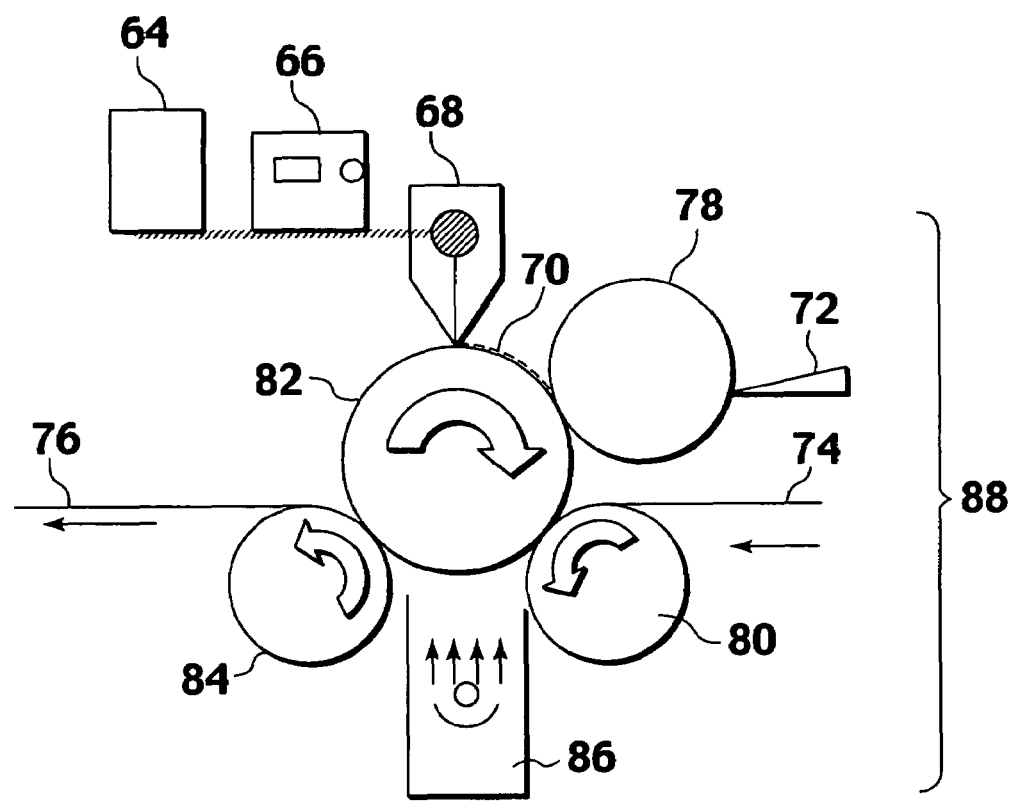
FIG. 14 is a view showing an apparatus for manufacturing a hologram or a predetermined shape in step S12 or S13 of FIG. 13.

FIG. 14 is a view showing an apparatus for forming the hologram or predetermined shape in step S12 or S13.

In this example, the apparatus 88 forms the hologram serving as a diffuser on the exit surface 13 of the optical film 10 in step S12. The apparatus can also form diffraction gratings and prisms. In step S13, the apparatus 88 also forms the prism on the incident surface 12 of the optical film 10 whose exit surface 13 has been provided with the hologram.

In the apparatus 88, a metal mold roll 82 faces a supply head 68 for supplying photo-curing resin 70. On the downstream side in a rotational direction of the metal mold roll 82, there are a metering roll 78, a nip roll 80, an ultraviolet irradiator 86, a mold releasing roll 84 in this order.

The metal mold roll 82 has grooves on a circumferential face thereof in the rotational direction. The grooves form ridges on the surface of the photo-curing resin 70.

The grooves are formed on the surface of the metal mold roll 82 with a diamond tool and precision lathe. The metal mold roll 82 is made of brass. After forming the grooves with a diamond tool, the metal mold roll 82 is electroless-plated with chrome to prevent oxidation and provide gloss and mechanical strength. According to the embodiment, the photo-curing resin 70 may be SANRAD R201 (trade name by Sanyo Chemical Industries Ltd.).

During manufacturing, the photo-curing resin 70 is supplied from a resin tank 64 through a pressure controller 66 and the supply head 68 to the metal mold roll 82. At this time, the supply pressure of the photo-curing resin 70 is detected by a pressure sensor and is controlled by the pressure controller 66, to adjust an applying pressure to the metal mold roll 82. The photo-curing resin 70 applied to the metal mold roll 82 is regulated with the metering roll 78 to a constant film thickness. The metering roll 78 has a doctor blade 72 to remove resin attached to the metering roll 78 and stabilize the evenness of the resin applied to the metal mold roll 82.

Between the metal mold roll 82 and the nip roll 80 that is on the downstream side of the metering roll 78, a transparent base film (transparent film) 74 serving as the base film 10 is supplied. The transparent base film 74 is held with the nip roll 80 and metal mold roll 82, to tightly attach the photo-curing resin 70 to the transparent base film 74.

The tightly attached photo-curing resin 70 and transparent base film 74 reach the ultraviolet irradiator 86, which emits ultraviolet rays to set the photo-curing resin 70. At this time, the photo-curing resin 70 adheres to the transparent base film 74 to form an integrated film. The mold releasing roll 84 releases the integrated film sheet 76 from the metal mold roll 82. In this way, the long film sheet 76 is continuously produced.

After forming the integrated film sheet 76 with the hologram formed on the exit surface of the base film 74, similar processes are carried out to form a prism on an incident surface 12 of the film sheet 76. These processes provide the optical film 10 having the hologram on the exit surface 13 of the base film 11 and the prism on the incident surface 12 of the base film 11.

The manufactured film is cut into a predetermined size to provide the optical film 10. A conventional extrusion technique or thermal pressing technique has a limit on the thickness of a diffraction grating. For example, a 2-inch area film has a thickness limit of 0.8 to 1.0 mm and a 6-inch area film has a thickness limit of 1.0 to 1.5 mm. It is difficult for the related arts to make thinner films. The embodiment of the present invention employs the metal mold roll 82 to continuously manufacture a film that can be thinner than the conventional films.

The embodiment cuts a long film into the optical films 10. Accordingly, the embodiment can more easily manufacture the films than the conventional manufacturing methods and can reduce manufacturing costs of the films.

According to the conventional injection molding technique, optical films of different sizes must be manufactured with different metal molds having proper sizes, to increase manufacturing costs. According to the conventional thermal pressing technique, transparent resin sheets of a fixed size must be manufactured by cutting end faces of each resin sheet and polishing the cut end faces. Namely, the conventional technique additionally needs the cutting and polishing processes. The embodiment of the present invention needs only cutting the film into a required size.

According to the embodiment, the transparent base film 74 is made of polyethylene terephthalate (PET). The material is not limited to this. Polycarbonate, acrylic resin, thermoplastic urethane, and the like are also usable. Also, the photo-curing resin 70 may be made of other material such as acryl modified epoxy and acryl modified urethane.

According to the embodiment, a light source of the ultraviolet irradiator 86 is a metal halide lamp (maximum output of 8 kW) and a feeding speed of the film sheet 76 is 6 m/min. The feeding speed is dependent on the curing characteristic of the photo-curing resin 70 and the light absorbing characteristic of the transparent base film 74. By using a metal halide lamp of higher power (higher wattage), the feeding speed can be increased.

Figure 15:
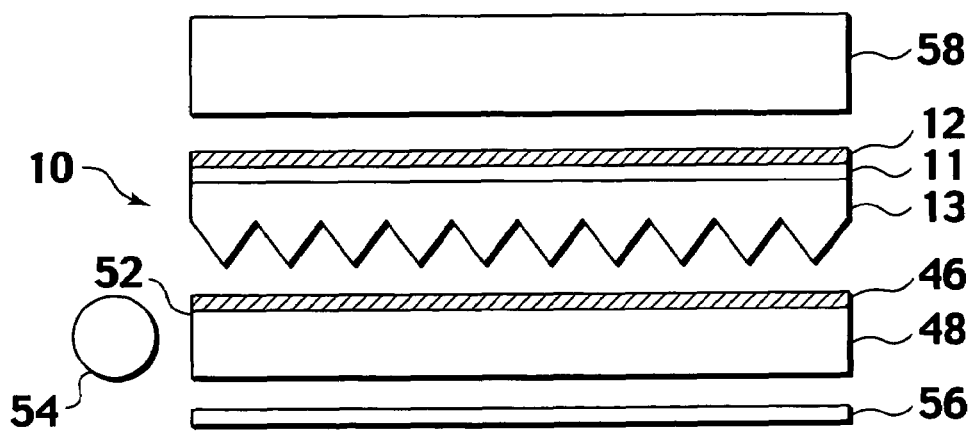
FIG. 15 is a view showing a configuration of a liquid crystal display employing an optical film and a surface light source.

FIG. 15 is a view showing a configuration of a liquid crystal display employing an optical film and a surface light source.

The liquid crystal display is used for a cellular phone, a thin-type personal computer, and the like. The surface light source includes a light source 54, a reflector 56, a light guide 48, a diffuser 46, and an optical film 10. The display also has a liquid crystal panel 58.

In the surface light source, the reflector 56, light guide 48, diffuser 46, and optical film 10 are arranged from the bottom in this order. Light emitted from the light source 54 is made incident to an end face 52 of the light guide 48 and is totally reflected by protrusions (not shown) formed on a back face 50 that opposes an exit surface of the light guide 48. The reflected light advances toward the diffuser 46 such as a hologram formed over the exit surface. The hologram serving as the diffuser 46 may have an anisotropic diffusion characteristic to diffuse light in different directions depending on locations on the exit surface.

When light is reflected by the bottom surface of the light guide 48, a bright line occurs on a straight line between a view point and a light source. To decrease the bright line, the hologram diffuses light into a direction perpendicular to the straight line. In addition, the hologram suppresses chromatic dispersion.

The hologram may be a surface relief hologram. The surface relief hologram may be made of embosses formed by transferring from an electrocasting roll having a pattern of speckles.

The hologram has many speckles at random in a given longitudinal direction. The speckles are thin elliptic recesses. Light made incident to the hologram is strongly diffused into a direction orthogonal to the longitudinal direction of the speckles. By selecting the direction and size of the speckles, the anisotropic diffusing characteristic of the hologram can be selected.

To simplify the structure of the surface light source, the diffuser 46 may be omitted. In this case, light emitted from the light guide 48 is directly made incident to the optical film 10 without diffused by the diffuser 46.

The light diffused by the diffuser 46 is made incident to the optical film 10. The optical film 10 is arranged to bend light and prevent reflection. Namely, the optical film 10 perpendicularly bends light obliquely made incident thereto from the diffuser 46, to efficiently transmit light substantially having a uniform brightness distribution to the liquid crystal panel 58.

In the surface light source, the optical film 10 may be provided with, in the vicinity thereof, a film having a function of preventing at least one of polarization split, color separation, and reflection. This film may be a diffraction grating having relief shapes at intervals of 0.6 µm or smaller and having a depth of 0.5 µm or below.

Figure 16:
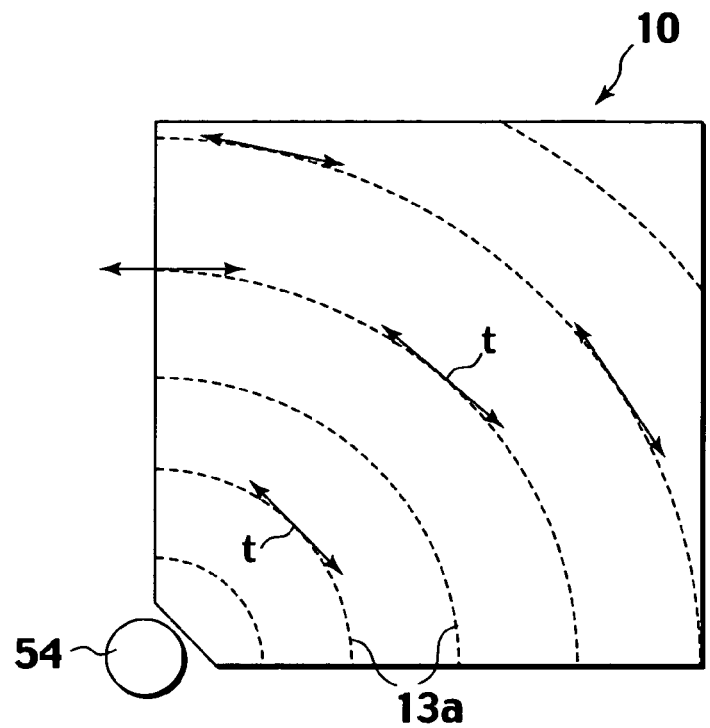
FIG. 16 is a view showing a first example of an optical film having its own prism arrangement and hologram diffusing direction.

FIG. 16 is a view showing a first example of an optical film 10 having its own prism arrangement and hologram diffusing direction.

In the first example, the optical film 10 has a square shape. A light guide (not shown) also having a square shape is arranged in parallel with the optical film 10. A light source 54 is arranged in the vicinity of one corner of the optical film 10, i.e., in the vicinity of one corner of the light guide. The light guide reflects light from the light source 54 toward the optical film 10, which obliquely receives the light from the light guide.

An incident surface of the optical film 10 is provided with a prism having grooves or ridges that are concentrically formed around the light source 54, to bend the incident light from the light guide in a direction perpendicular to an exit surface.

The prism on the incident surface of the optical film 10 reflects light. When the reflection continuously occurs on a straight line between a view point and the light source 54, a bright line appears to deteriorate the quality of images displayed on a liquid crystal panel.

On the exit surface, a hologram is formed to function as a diffuser to diffuse light in a tangential direction t of each concentric circle. Accordingly, light emitted from the exit surface is diffused in a direction perpendicular to the bright line, thereby suppressing the bright line.

The hologram may be formed on the incident surface of the optical film 10. Also in this case, the hologram serves as a diffuser to diffuse light in the tangential direction t, to suppress the bright lines.

Figure 17:
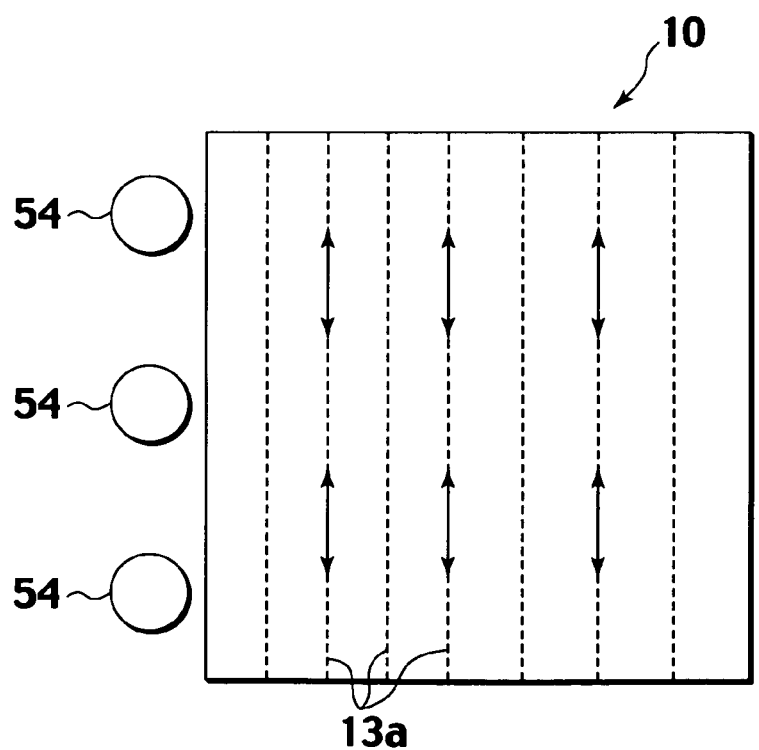
FIG. 17 is a view showing a second example of an optical film having its own prism arrangement and hologram diffusing direction.

FIG. 17 is a view showing a second example of an optical film 10 having its own prism arrangement and hologram diffusing direction.

In the second example, the optical film 10 has a square shape. A light guide (not shown) also having a square shape is arranged in parallel with the optical film 10. Light sources 54 are arranged in the vicinity of one side of the optical film 10, i.e., in the vicinity of one side of the light guide.

An incident surface of the optical film 10 is provided with a prism having grooves or ridges that are in parallel with the side adjacent to the light sources 54, to bend the incident light from the light guide in a direction perpendicular to an exit surface.

On the exit surface 13 of the optical film 10, a hologram is formed to diffuse light in a direction t in which the parallel grooves or ridges extend, to suppress the bright lines mentioned above.

The hologram may be formed on the incident surface of the optical film 10. Also in this case, the hologram serves as a diffuser to diffuse light in the direction t, to suppress the bright lines.

As mentioned above, each of the embodiments provides an optical film having a hologram of small chromatic dispersion, small polarized wave dispersion, and high diffraction efficiency to perpendicularly bend white light emitted from a surface light source. Each of the embodiments also provides a surface light source employing such an optical film.

The hologram may be a diffraction grating. The diffraction grating may be an echelette grating having sawteeth to improve a diffraction efficiency. The diffraction efficiency of the diffraction grating may be more improved by optimizing the shape thereof from the sawteeth.

According to the present invention, there is provided an optical film capable of improving brightness and controlling a light emitting direction, as well as a surface light source employing such an optical film.

The invention claimed is:

1. A surface light source comprising a light guide and an optical film arranged on an exit surface of the light guide, wherein the optical film comprises:
   an incident surface having a shape to bend incident light; and
   an exit surface opposing the incident surface and having a diffuser to diffuse light only into a specific spatial range of angles,
   wherein the incident surface is a transmissive diffraction grating that bends while light having an incident angle of 60°±15° into a direction perpendicular to the exit surface of the optical film and a relational expression $h = m \times d/(n-1)$ with $0.5 < m < 1.0$ is satisfied, wherein d is an average interval of the grating and 0.6 μm≦d≦10 μm, h is an average depth of the grating and n is a refractive index of the grating.

2. The surface light source as set forth in claim 1, wherein diffusion angles of the diffuser of the exit surface of the optical film are 10 degrees or below in every direction.

3. The surface light source as set forth in claim 1, wherein a haze value of the diffuser of the exit surface of the optical film is 50% or below.

4. The surface light source as set forth in claim 1, wherein the grating has a sawteeth shape or the grooves of the grating are buried up to less than 50% of the depth thereof.

5. The surface light source as set forth in claim 4, wherein the diffuser of the exit surface of the optical film has an anisotropic diffusing characteristic.

6. The surface light source as set forth in claim 4, wherein diffusion angles of the diffuser of the exit surface of the optical film are 10 degrees or below in every direction.

7. The surface light source as set forth in claim 4, wherein a haze value of the diffuser of the exit surface of the optical film is 50% or below.

8. The surface light source as set forth in claim 1, wherein the diffuser of the exit surface of the optical film has an anisotropic diffusing characteristic.

* * * * *